(12) United States Patent
Frulloni et al.

(10) Patent No.: US 9,517,608 B2
(45) Date of Patent: Dec. 13, 2016

(54) PARTICLE TOUGHENING FOR IMPROVING FRACTURE TOUGHNESS

(71) Applicant: Cytec Industries Inc, Woodland Park, NJ (US)

(72) Inventors: Emiliano Frulloni, Rossett (GB); Vincent Aerts, Wrexham (GB); Samuel Hill, Wrexham (GB)

(73) Assignee: Cytec Industries Inc., Woodland Park, NJ (US)

( * ) Notice: Subject to any disclaimer, the term of this patent is extended or adjusted under 35 U.S.C. 154(b) by 331 days.

(21) Appl. No.: 14/079,918

(22) Filed: Nov. 14, 2013

(65) Prior Publication Data

US 2014/0170408 A1    Jun. 19, 2014

(30) Foreign Application Priority Data

Dec. 19, 2012 (GB) .................................. 1222934.0

(51) Int. Cl.
*B32B 5/28* (2006.01)
*B32B 37/14* (2006.01)
*C08J 5/24* (2006.01)

(52) U.S. Cl.
CPC .................. *B32B 5/28* (2013.01); *B32B 37/14* (2013.01); *C08J 5/24* (2013.01); *B32B 2250/03* (2013.01);
(Continued)

(58) Field of Classification Search
CPC ............. B32B 5/14; B32B 5/145; B32B 5/22; B32B 5/24; B32B 5/48; B32B 5/16; B32B 5/30; B32B 27/14; B32B 27/18; B32B 27/20; B32B 27/205; B32B 27/22; B32B 27/24; B32B 27/26; B32B 27/38; B32B 37/14; B32B 37/144; B32B 2250/42; B32B 2307/558
(Continued)

(56) References Cited

U.S. PATENT DOCUMENTS 4,883,787 A    11/1989    Conley et al.
4,957,801 A     9/1990    Maranci et al.
(Continued)

FOREIGN PATENT DOCUMENTS

EP         0564235 B1    9/1998
WO      2009032809 A1    3/2009
(Continued)

OTHER PUBLICATIONS

Department of Defense, Composite Materials Handbook, vol. 1, p. 6-41. Jun. 17, 2002.*

*Primary Examiner* — Arti Singh-Pandey
*Assistant Examiner* — Frank Vineis
(74) *Attorney, Agent, or Firm* — Thi Dang

(57) ABSTRACT

A curable prepreg ply formed by applying two outer resin films to the top and bottom surfaces, respectively, of a layer of resin-impregnated reinforcement fibers. The outer resin films contains insoluble toughening particles, and partially soluble or swellable toughening particles, but the resin matrix which impregnates the reinforcement fibers does not contain the same toughening particles. The insoluble toughening particles are insoluble in the resin matrix of the resin films upon curing of the prepreg ply. The partially soluble or swellable toughening particles are partially soluble or swellable in the resin matrix of the resin films upon curing of the prepreg ply, but remain as discreet particles after curing.

6 Claims, 5 Drawing Sheets

(52) U.S. Cl.
CPC ...... *B32B 2262/106* (2013.01); *B32B 2264/00* (2013.01); *B32B 2264/12* (2013.01); *B32B 2305/30* (2013.01); *B32B 2307/56* (2013.01); *B32B 2363/00* (2013.01); *Y10T 156/10* (2015.01); *Y10T 428/249952* (2015.04)

(58) Field of Classification Search
USPC .......... 428/221, 295.1–301.4, 411.1, 413–418,428/402–407, 323, 327, 328, 329, 330, 331; 156/62.2–62.8; 523/400–468
See application file for complete search history.

(56) References Cited

U.S. PATENT DOCUMENTS

| | | |
|---|---|---|
| 5,028,478 A | 7/1991 | Odagiri et al. |
| 5,242,748 A | 9/1993 | Folda et al. |
| 5,268,223 A | 12/1993 | Qureshi et al. |
| 5,278,224 A | 1/1994 | Olesen et al. |
| 5,310,825 A | 5/1994 | Babayan et al. |
| 5,985,431 A | 11/1999 | Oosedo et al. |
| 2008/0286578 A1 | 11/2008 | Tilbrook et al. |
| 2010/0304118 A1* | 12/2010 | Baidak ................. C08G 59/504 428/295.1 |
| 2010/0305239 A1* | 12/2010 | Wei ..................... C08G 59/3227 524/35 |
| 2012/0107560 A1 | 5/2012 | Rogers et al. |
| 2012/0164455 A1* | 6/2012 | Griffin .................... C08J 5/24 428/413 |

FOREIGN PATENT DOCUMENTS

| | | |
|---|---|---|
| WO | 2011025873 A1 | 3/2011 |
| WO | 2012002434 A1 | 1/2012 |
| WO | 2012087602 A2 | 6/2012 |

* cited by examiner

X10 Magnification

X10 Magnification

X20 Magnification

X20 Magnification

PARTICLE TOUGHENING FOR IMPROVING FRACTURE TOUGHNESS

This application claims benefit of priority from United Kingdom Patent Application No. 1222934.0 filed on Dec. 19, 2012, which is in incorporated herein by reference in its entirety.

BACKGROUND

Fiber-reinforced polymer (FRP) composites have been used as high-strength, low-weight engineering materials to replace metals in aerospace structures such as primary structures of aircrafts. Important properties of such composite materials are high strength, stiffness and reduced weight.

Multiple layers of prepreg plies are commonly used to form structural composite parts that have a laminated structure. Delamination of such composite parts is an important failure mode. Delamination occurs when two layers de-bond from each other. Important design limiting factors include both the energy needed to initiate a delamination and the energy needed to propagate it.

A cured composite (e.g. prepreg layup) with improved resistance to delamination is one with improved Compression Strength After Impact (CAI) and fracture toughness ($G_{Ic}$ and $G_{IIc}$).

CAI measures the ability of a composite material to tolerate damage. In the test to measure CAI, the composite material is subject to an impact of a given energy and then loaded in compression. Damage area and dent depth are measured following the impact and prior to the compression test. During this test, the composite material is constrained to ensure that no elastic instability is taking place and the strength of the composite material is recorded.

Fracture toughness is a property which describes the ability of a material containing a crack to resist fracture, and is one of the most important properties of a material for aerospace applications. Fracture toughness is a quantitative way of expressing a material's resistance to brittle fracture when a crack is present.

Fracture toughness may be quantified as strain energy release rate ($G_c$), which is the energy dissipated during fracture per unit of newly created fracture surface area. $G_c$ includes $G_{Ic}$ (Mode 1—opening mode) or $G_{IIc}$ (Mode II—in plane shear). The subscript "Ic" denotes Mode I crack opening, which is formed under a normal tensile stress perpendicular to the crack, and the subscript "IIc" denotes Mode II crack produced by a shear stress acting parallel to the plane of the crack and perpendicular to the crack front. The initiation and growth of a delamination is often determined by examining Mode I and Mode II fracture toughness.

SUMMARY

Disclosed herein is a curable prepreg ply having two resin films applied to the top surface and the bottom surface, respectively, of a layer of resin-impregnated reinforcement fibers, wherein the resin films contains insoluble toughening particles, and partially soluble or swellable toughening particles, but the resin matrix which impregnates the reinforcement fibers does not contain the same toughening particles. The insoluble toughening particles are insoluble in the resin matrix of the resin films upon curing of the prepreg ply. The partially soluble or swellable toughening particles are partially soluble or swellable in the resin matrix of the resin films upon curing of the prepreg ply, but remain as discreet particles after curing. A composite structure may be formed by laying up a plurality of these prepreg plies.

Methods relating to fabricating the prepreg ply and the composite structure are also disclosed herein.

DETAILED DESCRIPTION

Attempts have been made to toughen the interlaminar region between adjacent prepreg plies using toughening particles. Un-crosslinked, soluble thermoplastic particles have been used to toughen thermosetting resin systems but they have been associated with various problems. One problem with thermoplastic particles that dissolve during curing is that the resulting composite does not retain sufficient thermosetting thermomechanical properties. Some insoluble particles do not allow the resin material to penetrate the particles causing a de-bonding between the particles and the resin matrix, thus, they do not confer sufficient strength to the composite material. Therefore, the selection of toughening particles is important.

It has been found that by incorporating certain blend of toughening particles into the interlaminar regions of a multilayer composite, the CAI and fracture toughness of the final, cured composite may be improved. The multilayer composite in this context refers to a laminate composed of multiple structural layers arranged in a stacking arrangement (i.e. a lay-up or a laminate). Each structural layer is composed of resin-impregnated fibers, i.e. reinforcing fibers impregnated with a resin matrix. The "interlaminar region" refers to the region between two adjacent structural layers of reinforcement fibers.

Moreover, it has been discovered that the $G_{IIc}$ fracture toughness of the multilayer composite may be further improved by incorporating a specific blend of insoluble toughening particles and partially soluble (or swellable) toughening particles into the interlaminar regions of a multilayer composite in addition to utilizing a four-film process to apply the toughening particles to the structural layers. It was found unexpectedly that the placement of the toughening particles via the four-film process results in a substantially uniform interlaminar region because the particles do not migrate away from the interlaminar region upon curing of the multilayer composite (or prepreg layup).

This improvement is seen when compared to the same composite in which the blend of toughening particles is applied via a two-film process during manufacturing. However, the same improvement in $G_{IIc}$ fracture toughness is not seen when the four-film process is utilized but only one type of toughening particles (either insoluble or partially soluble/swellable) is incorporated into the interlaminar regions.

Figure 1A:
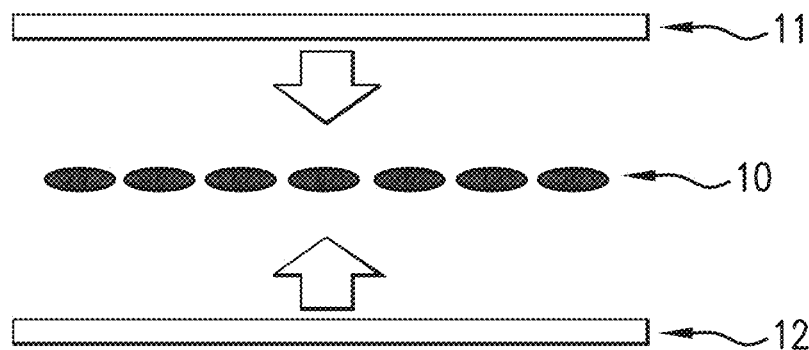
FIGS. 1A-1D illustrates a four-film process for making a prepreg ply.
Figure 1B:
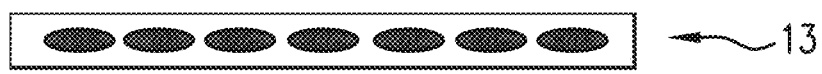
Figure 1C:
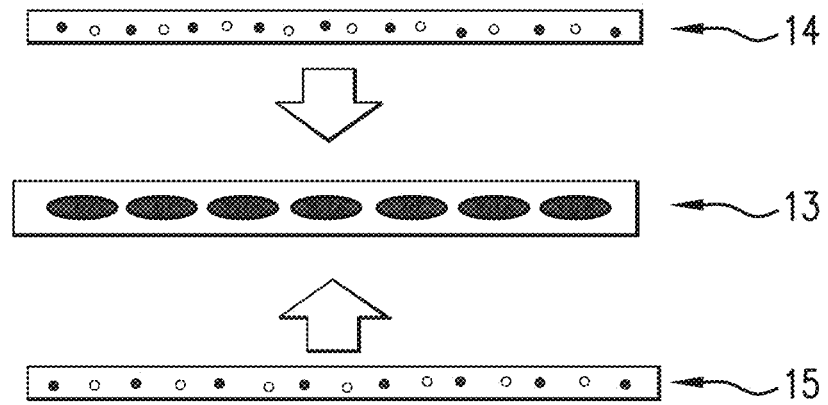
Figure 1D:
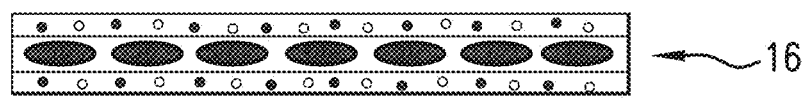

FIGS. 1A-1D illustrates the four-film process mentioned above. Referring to FIG. 1A, two resin films 11, 12 are applied to the top and bottom surfaces, respectively, of a layer of reinforcement fibers 10. The fibrous reinforcement 10 may be unidirectionally aligned fibers (i.e. continuous fibers aligned on the same plane and in the same direction). However, it should be understood that the reinforcement fibers 10 may be aligned in multiple directions or may take the form of a woven fabric. Heat and pressure are then applied to the resulting assembly to form a resin impregnated fiber layer 13 as shown in FIG. 1B. Referring to FIGS. 1C and 1D, two additional resin films 14, 15 are subsequently pressed onto the top and bottom surfaces, respectively, of the resin-impregnated layer 13 to yield a composite layer 16, also referred to as a "prepreg" or "prepreg ply". To form a composite structure, a plurality of composite layer 16 are laid up in a stacking arrangement to form a composite lay-up having toughening particles in the interlaminar region between adjacent composite layers.

In one embodiment, the resin films 11, 12, 14, 15 are formed from substantially the same curable thermoset resin matrix with the difference being that the outer films 14 and 15 contain a mixture of insoluble and partially soluble or swellable toughening particles, whereas the first two films 11 and 12 do not. The ratio of (i) insoluble toughening particles to (ii) partially soluble or swellable toughening particles in the resin matrix forming the outer resin films 14, 15 may be ranging from 20:80 to 80:20.

Figure 2:
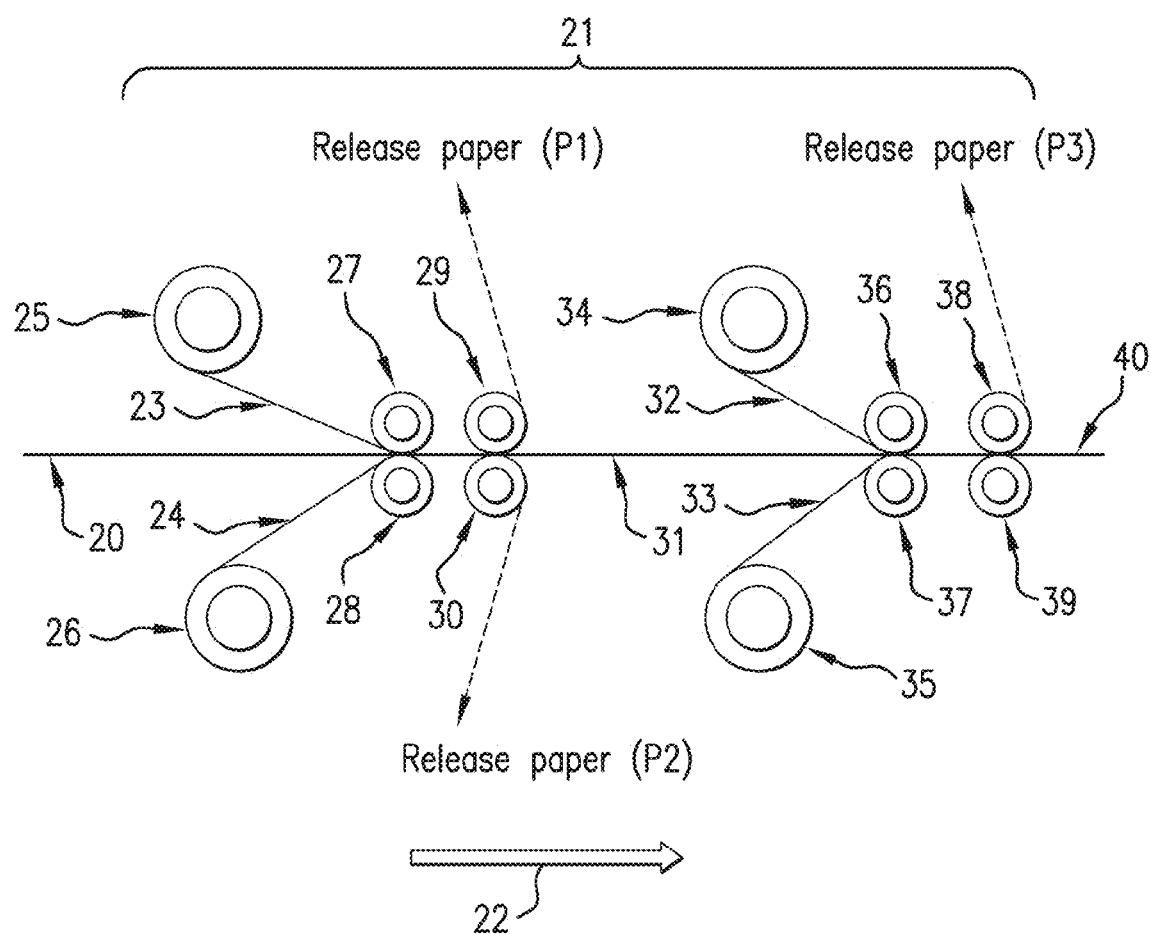
FIG. 2 illustrates an exemplary system for carrying out the four-film process, according to one embodiment.

FIG. 2 illustrates an exemplary system for carrying out the four-film process. A continuous layer of reinforcement fibers 20 are fed into an impregnation zone 21 along a longitudinal path 22. Two resin films 23, 24, without toughening particles, each supported by a release paper, are unwound from supply rollers 25, 26 and pressed onto the top and bottom surfaces, respectively, of the fiber layer 20 via the aid of pressure/consolidating rollers 27, 28, 29, 30 as the fiber layer 20 moves through the pressure nips formed by the pressure rollers 27-30. Pressure from the pressure rollers 27-30 causes the resin films 23, 24 to impregnate the fiber layer 20, resulting in a resin-impregnated fiber layer 31. The release papers P1 and P2, which support resin films 23 and 24, respectively, are then peeled off from the surface of the impregnated fiber layer 31 after it passes through the second pressure nip between rollers 29 and 30. Next, two additional resin films 32, 33 containing toughening particles are unwound from supply rollers 34, 35 and are pressed onto the top and bottom surfaces, respectively, of the impregnated fiber layer 31, via the aid of pressure/consolidating rollers 36, 37, 38, 39, resulting in prepreg 40. Release paper P3, which supports resin 32, is peeled off from the prepreg 40 after it passes through the nip between rollers 38 and 39. As such, the resulting prepreg 40 is on a release paper and may be wound up at a downstream location (not shown). The first two resin films 23, 24 may be pre-heated in advance of and upstream to the pressure nips formed between opposing pressure rollers 27-30 in order to soften the resin films and to facilitate the impregnation process. However, heating during impregnation is not sufficient to cure the resin matrix.

The four-film process described above is different from a two-film process, which is more typical in the industry for forming a prepreg. In the two-film process, only two films of resin matrix are applied to opposite sides of a layer of reinforcing fibers using heat and pressure to thereby impregnate the fibers. When the resin matrix contains toughening particles that are larger than the interstices or gaps between adjacent fibers, the particles are filtered out by the fibers during impregnation, and thus, remain on the outside of the fiber layer.

Figure 3A:
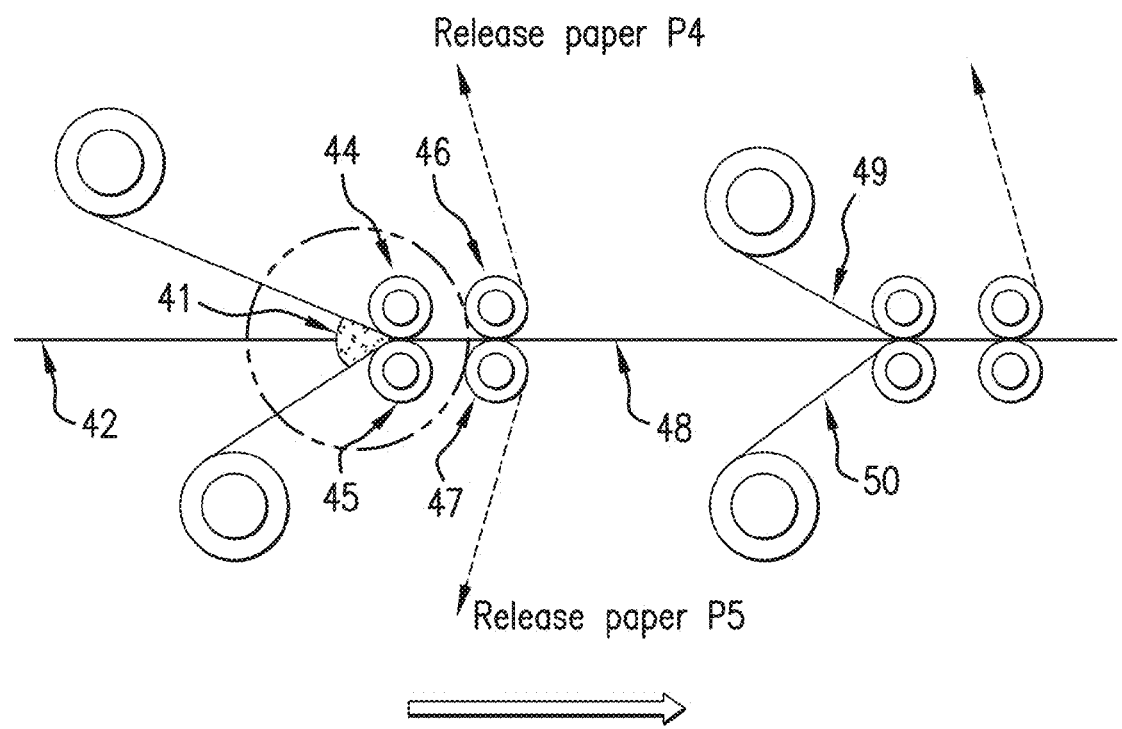
FIG. 3A illustrates an exemplary prepreg forming system according to another embodiment, wherein a resin bead is formed ahead of the first pressure nip.
Figure 3B:
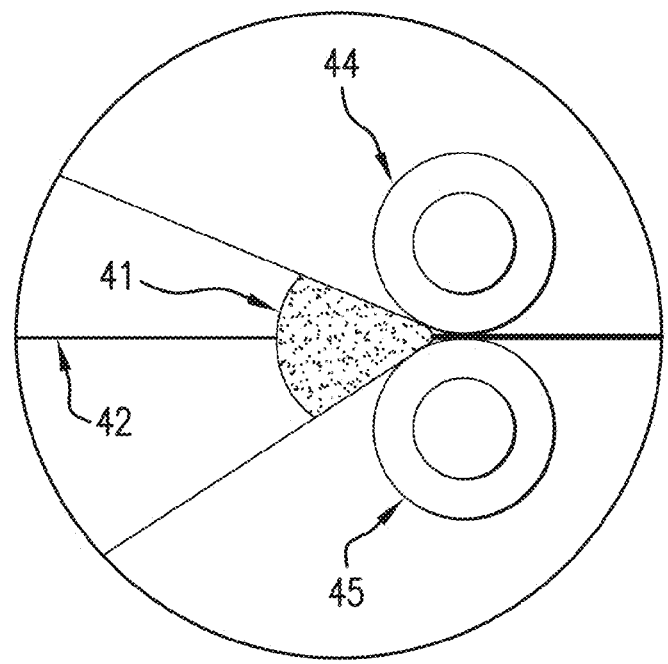
FIG. 3B is an exploded view of the resin bead shown in FIG. 3A.

FIG. 3A illustrates another prepreg forming system, which is similar to that shown in FIG. 2 except that a bead of resin 41 is formed between two release papers P4, P5 ahead of the first nip formed between pressure/consolidating rollers 44, 45 to impregnate the layer 42 of reinforcement fibers, and the resin content is controlled by changing the gap between rollers 44, 45 to form a resin-impregnated fiber layer 48. The bead of resin 41 is an accumulation of excess resin purposely built up ahead of the first nip formed between rollers 44, 45. An exploded view of the resin bead 41 is shown in FIG. 3B. As the reinforcement fiber layer passes through the excess resin it becomes coated with the resin itself. A resin which does not contain particles is used in this step of the process. In one embodiment, the resin bead 41 may be created by allowing some resin to be spread on one of the release papers before it arrives at the first nip. The release papers P4, P5 are then peeled off from the resin-impregnated fiber layer 48 after it passes through the second pressure nip formed by rollers 46 and 47. Subsequently, two additional resin films 49, 50 containing toughening particles are then pressed onto the resin-impregnated fiber layer 48 to form a prepreg as described above in relation to FIG. 2.

Solubility

Determining whether certain particles are insoluble or soluble relates to the solubility in a particular resin system in which they reside. The resin system may include one or more thermoset resins, curing agents and/or catalysts, and minor amounts of optional additives for modifying the properties of the uncured or cured resin matrix.

Hot stage microscopy can be used to determine if a particle is insoluble, partially soluble, or swellable in a resin matrix. First, a sample of dry polymeric particles (i.e., not combined with a resin) is measured to determine the average particle size and volume. Second, a sample of particles is dispersed in the desired resin matrix via mechanical mixing. Third, a sample of the resulting mixture is placed on a microscope slide which is then placed in a hot stage setup under a microscope. Then, the sample is heated to the desired cure temperature, and any change in size, volume or shape of the particles is observed and measured. All hot stage testing may be carried out at a particle loading of 10 wt. % (weight percentage) of the resin matrix containing no curative or catalyst.

Insoluble Toughening Particles

When the toughening particles are subjected to the above hot stage microscopy analysis and any change in diameter or volume of the particle is minimal, e.g., less than 5%, preferably less than 1%, as compared to the original "dry" particles, then the particles are considered to be insoluble. In some embodiments, insoluble toughening particles include particles that melt during the hot stage microscopy analysis but are incompatible with the resin matrix and therefore reform into discrete particles upon cooling. For analytical purposes only, the particles may flow during the hot stage microscopy analysis and the degree of crystallinity may also change.

For epoxy-based resin matrix, insoluble particles may include polymeric particles made of one or more polymers selected from: polyamideimide (PAI), polyamide (PA) polyetheretherketone (PEEK), polyetherketoneketone (PEKK), polyester, polypropylene, polyphenylene sulphide (PPS), liquid crystal polymers (LCP).

In one embodiment, the insoluble particles are insoluble thermoplastic particles that do not dissolve during the curing process and remain within the interlaminar regions of the cured composite material. Examples of suitable insoluble thermoplastic particles include polyamideimide (PAI) particles and polyamide (PA) particles (e.g. nylon or polyphthalamide (PPA) particles), which are insoluble in epoxy resin system during the curing cycle thereof.

Certain grades of polyimide particles may be suitable as insoluble toughening particles. For example, polyimides prepared from benzophenone tetracarboxylic acid dianhydride (BTDA), 4,4'-methylenedianiline (MDA), and 2,4-toluenediamine (TDA), and having a non-phthalimide carbon content which contains between 90 and 92 percent aromatic carbons (e.g. P84 available commercially from Lenzing AG).

Insoluble thermoplastic particles have been found to be effective as interlaminar tougheners to avoid the loss of hot wet performance. Because these thermoplastic particles remain insoluble in a resin matrix even after curing, they impart improved toughness, damage tolerance, hot wet performance, processing, micro-cracking resistance, and reduced solvent sensitivity to the cured resin.

In addition to the above polymeric particles, inorganic particles formed of conductive materials (e.g., metal, graphite, carbon), ceramic, silica, may also be added as insoluble particles.

Partially Soluble and Swellable Toughening Particles

If the particle undergoes partial dissolution and does not fully dissolve in a resin matrix upon thermal curing of the resin matrix, then the particle is considered to be partially soluble. When such partially soluble particles are subject to the above hot stage microscopy analysis, the change in diameter or volume of the particle is more than 5% when compared with the original "dry" particles, but the particle is still discernable as a discrete particle after curing and cooling. As used herein, "dissolving" in a resin means forming a homogeneous phase with the surrounding resin. When they are used in a curable prepreg ply, the partially soluble toughening particles may be thermoplastic particles that decrease in volume by more than 5% upon curing of the prepreg ply, but remain as discreet particles after curing.

"Swellable" particles include particles that increase in the particle diameter or volume by more than 5% when subjected to the above hot stage microscopy analysis. The swelling is caused by the infusion of the surrounding resin matrix into the outer surface of the particle.

Partially soluble or swellable thermoplastic particles have been found to impart good tensile strength properties to a composite material. Certain engineered cross-linked thermoplastic particles are particularly suitable as interlaminar toughening particles. These cross-linked thermoplastic particles may be considered as partially soluble, and at the same time, swellable.

Engineered Cross-Linked Thermoplastic Particles

In one embodiment, the engineered cross-linked thermoplastic particle is composed of a cross-linking network created by crosslinking a cross-linkable thermoplastic polymer having one or more one or more reactive groups with a cross-linking agent that is chemically reactive to the reactive groups, wherein the cross-linking agent directly cross-links the polymer chains to each other via the reactive groups. The reactive groups may be end groups or pendant groups on the polymer backbone. The direct cross-linking reaction of this embodiment may be described as "tying-up" the polymer molecules via direct cross-linking of the polymer chains using one or more reactive groups.

Cross-linked thermoplastic particles may be produced by an emulsion process, which includes dissolving the thermoplastic polymer, the crosslinking agent, and a catalyst into a common solvent, which is immiscible with water. An emulsion is then created in water by using a non-ionic surfactant, whereby emulsified particles are formed. The emulsified particles are subsequently dried and cured so that the polymeric chains become chemically cross-linked. The reacting conditions and the type and level of crosslinking agent will determine the final properties of the particles. Reacting conditions such as temperature result in greater crosslinking. Crosslinking agents with greater functionality will affect the extent of the crosslinking of the thermoplastic particles. Other crosslinking agents with relatively lower functionality will crosslink to a lesser extent. The crosslinking agent concentration will also be directly proportional to the extent of crosslinking.

Examples of suitable thermoplastic polymers that are susceptible to cross-linking include, but are not limited to, those selected from: polyethersulfones (PES) with hydroxyl end groups; polyetherimides (PEI) with hydroxyl end groups, amine groups or anhydride end groups; polyphenyleneoxides (PPO) or polyphenylene ether (PPE) with hydroxyl end groups; polyaryletherketones (PAEK), including polyetheretherketone (PEEK), polyetherketoneketone (PEKK), with fluoro- or hydroxyl end groups; or any engineering thermoplastic polymers with reactive end groups or main chain functional groups. Specific examples of cross-linkable thermoplastic polymers includes PES with hydroxyl end groups, PES-PEES copolymer with amine end groups, PEI with amine end groups, PPE with hydroxyl end groups.

Depending on the chemical nature of the thermoplastic polymer's end groups/functionalities, an appropriate multifunctional crosslinking agent with multiple reactive sites may be selected. Examples of such crosslinking agents are: alkylated melamine derivatives (e.g. Cymel 303), acid chlorides (e.g. 1,3,5 benzenetricarbonyl trichloride), multi-functional epoxies (e.g. Araldite MY0501, MY721), carboxylic acids (e.g. 1,2,4,5-benzenetetra-carboxylic acid). Polyunsaturated thermoplastic polymers may also be easily cross-linked using radical addition using heat, UV or other radiation curing technique.

In another embodiment, the invention provides an engineered particle composed of an inter-penetrating polymer network (IPN), which is made up of thermoplastic polymer chains intertwined with an independent cross-linking network. The IPN is created by reacting one or more compounds (e.g. cross-linkable monomers) having one or more reactive groups with a cross-linking agent that is chemically reactive to the reactive groups in the presence of a thermoplastic polymer. The reaction (which occurs under certain cross-linking or curing conditions) causes the compounds to become cross-linked via the reactive groups, thereby forming an independent cross-linking network. As such, the thermoplastic polymer chains are intertwined with the independent cross-linking network at a molecular level to form an IPN. This approach may be described as "tying-up" the thermoplastic polymer chains via the formation of a separate and independent cross-linking network, thereby creating an inter-penetrating network. Thus, in this embodiment, the thermoplastic polymer does not need to have reactive groups thereon.

As an example, an IPN may be created by: (i) forming an emulsion containing a thermoplastic polymer, a multifunctional epoxy resin and an amine curing agent capable of cross-linking the epoxy resin; (ii) removing the solvent from the emulsion and collecting the condensate, which is in the form of solid particles; (iii) drying the particles followed by curing (e.g. by heating) so that the epoxy resin becomes cross-linked. As a result of curing, the cross-linked epoxy forms an IPN with the thermoplastic polymer.

The cross-linked thermoplastic particles described herein are thermodynamically compatible with a thermoset resin matrix, such as an epoxy-based matrix, and they are chemically cross-linked in order to prevent their total dissolution in the resin during curing of the resin matrix.

The cross-linked thermoplastic particles described herein also form a "gradient interface" with the surrounding resin matrix in which they reside. The term "gradient interface" as used herein refers to the gradual and strong interface between each of the particles and the surrounding resin matrix. A gradient interface is achieved by using engineered cross-linked thermoplastic particles that are thermodynamically compatible with the thermoset resin, e.g. epoxy. The concentration of thermoplastic polymer in the core of a cross-linked thermoplastic particle is greatest at the center and gradually decreases towards the outer surface of the particle as the resin matrix enters the particle from the outer surface and moves towards the core. This gradual decrease in the thermoplastic concentration from the core to the outer surface of the thermoplastic particle forms the gradient interface between each of the thermoplastic particles and the surrounding resin matrix. Thus, there is no sharp delineation or transition between the thermosetting resin and the thermoplastic particle. If a sharp delineation or transition was present, the interface between the thermoplastic and the thermosetting resin would be much weaker in a composite material in comparison to a composite material containing a gradient interface. As such, the cross-linked thermoplastic particles may also be considered "swellable" because the resin matrix can diffuse into the particles when the particles are mixed into the resin matrix, thereby resulting in an increase in the particle size. However, the cross-linked particles will remain as discrete and discernable particles after curing of the resin matrix.

"Discrete particle" as used herein refers to a particle which is discernible in a resin matrix, and which may be detected by using Scanning Electron Microscopy (SEM), Optical Microscopy, or Differential Interference Contrast microscopy (DIC).

The benefit of the cross-linked thermoplastic particles is the ability to achieve locally high concentration of thermoplastic in the interlaminar region without facing the risk of obtaining a phase inversion. The thermoplastic content in the interlaminar region is known to increase the toughness of the material. However, when large quantities of linear compatible thermoplastic are blended with or dissolved into a thermoset resin, the thermoplastic is known to phase separate in an inverted manner during the cure of the thermoset resin, also known as reaction induced phase separation, leading to a thermoplastic continuous phase with inclusions of thermoset polymer. This phase inversion, in turn, is severely detrimental to the properties of the composite, primarily for temperature resistance and solvent resistance.

Other examples of partially soluble and/or swellable thermoplastic particles that are suitable for interlaminar toughening include certain grades of polyimide particles. Thermoplastic polyimides useful for the purposes discussed herein may swell or be partially soluble in the resin system at least during the curing cycle, but they must also resist dissolving to such an extent that they remain as discrete particles after curing. Not all polyimides perform equally for such application. Polyimides which have solubilities so great that they dissolve completely during the preparation of the resin matrix or during the prepreg fabrication process are not suitable.

Polyimides based on benzophenone tetracarboxylic acid dianhydride (BTDA) and 5(6)-amino-1-(4'-aminophenyl)-1, 3,3-trimethylindane (AATI), and contain only approximately 81 percent aromatic, 40 non-phthalimide carbons, would be useful for the purposes discussed herein. Likewise, those based on mixtures of AATI and MDA or TDA would be expected to work, so long as the aromatic, non-phthalimide carbon content is less than 90%. Other polyimides expected to be useful are those where the diamine is based in whole or in part on 2,2,4-trimethylhexane-1,6-diamine. Polyimides based on BTDA and AATI are also suitable. Such polyimides are available commercially under the trademark MATRIMID® 5218 from the Ciba-Geigy Corporation.

Additional examples of swellable particles include functionalized rubber particles. Functionalized rubber particles are formed of functionalized elastomers, which may include diene and olefin rubbers having, or have been modified to include carboxyl, carboxamide, anhydride, epoxy, or amine functionality. These rubber particles are further characterized as being partially crosslinked, such that they will exhibit sufficient integrity to resist being solubilized appreciably at temperatures that will normally be encountered during the fabricating and curing of the composite in which they are incorporated.

In general, the insoluble and partially soluble/swellable particles may have particle sizes or diameters in the range of 5-70 µm. The particles may be regular or irregular in shape, and may take the form of spherical particles, milled particles, pellets, etc.

In a composite, the total amount of toughening particles (insoluble and partially soluble/swellable particles) may constitute about 2% to 30% of the weight of resin matrix. Preferably, the content of toughening particles is within the range of 5% to 20% by weight. The optimum amount will depend on the inherent toughness of the resin matrix, the toughness of the particles, as well as other factors.

Resin Matrix

The resin matrix (or resin system), in which the toughening particles are dispersed, refers to a curable resin formulation and may contain one or more thermoset resins, which include, but are not limited to, epoxy resins, bismaleimide, vinyl ester resins, cyanate ester resins, isocyanate modified epoxy resins, phenolic resins, benzoxazine, formaldehyde condensate resins (such as with urea, melamine or phenol), polyesters, acrylics, and combinations thereof. In one embodiment, the resin matrix is an epoxy-based thermoset formulation which contains one or more multifunctional epoxy resins as the main polymeric component.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol S and bisphenol K; and polyglycidyl ethers of cresol and phenol based novolacs.

Specific examples are tetraglycidyl derivatives of 4,4'-diaminodiphenylmethane (TGDDM), resorcinol diglycidyl ether, triglycidyl-p-aminophenol, triglycidyl-m-aminophenol, bromobisphenol F diglycidyl ether, tetraglycidyl derivatives of diaminodiphenylmethane, trihydroxyphenyl methane triglycidyl ether, polyglycidylether of phenol-formaldehyde novolac, polyglycidylether of o-cresol novolac or tetraglycidyl ether of tetraphenylethane.

Commercially available epoxy resins suitable for use in the resin matrix include N,N,N',N'-tetraglycidyl diamino diphenylmethane (e.g. MY 9663, MY 720, and MY 721 from Huntsman); N,N,N',N'-tetraglycidyl-bis(4-aminophenyl)-1,4-diiso-propylbenzene (e.g. EPON 1071 from Momentive); N,N,N',N'-tetraclycidyl-bis(4-amino-3,5-dimethylphenyl)-1,4-diisopropylbenzene, (e.g. EPON 1072 from Momentive); triglycidyl ethers of p-aminophenol (e.g. MY 0510 from Hunstman); triglycidyl ethers of m-aminophenol (e.g. MY 0610 from Hunstman); diglycidyl ethers of bisphenol A based materials (e.g. Tactix 123 from Huntsman); 2,2-bis(4,4'-dihydroxy phenyl) propane (e.g. DER 661 from Dow, EPON 828 from Momentive), glycidyl ethers of phenol Novolac resins (e.g. DEN 431, DEN 438 from Dow); di-cyclopentadiene-based epoxy novolac (e.g. Tactix 556 from Huntsman); diglycidyl 1,2-phthalate (e.g. GLY CEL A-100); diglycidyl derivative of Bisphenol F (e.g. PY 306 from Huntsman). Other epoxy resins include cycloaliphatics such as 3',4'-epoxycyclohexyl-3,4-epoxycyclohexane carboxylate (e.g. CY 179 from Huntsman).

Generally, the resin matrix contains one or more thermoset resins in combination with additives such as curing agents, catalysts, co-monomers, rheology control agents, tackifiers, rheology modifiers, inorganic or organic fillers, soluble thermoplastic or elastomeric toughening agents, stabilizers, inhibitors, pigments/dyes, flame retardants, reactive diluents, and other additives well known to those skilled in the art for modifying the properties of the resin matrix before or after curing.

The addition of curing agent(s) and/or catalyst(s) may increase the cure rate and/or reduce the cure temperatures of the resin matrix. The curing agent for thermoset resins is suitably selected from known curing agents, for example, aromatic or aliphatic amines, or guanidine derivatives. An aromatic amine curing agent is preferred, preferably an aromatic amine having at least two amino groups per molecule, and particularly preferable are diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene; bis(4-aminophenyl)-1,4-diisopropylbenzene; 4,4'methylenebis-(2,6-diethyl)-aniline (MDEA from Lonza); 4,4'methylenebis-(3-chloro, 2,6-diethyl)-aniline (MCDEA from Lonza); 4,4'methylenebis-(2,6-diisopropyl)-aniline (M-DIPA from Lonza); 3,5-diethyl toluene-2,4/2,6-diamine (D-ETDA 80 from Lonza); 4,4'methylenebis-(2-isopropyl-6-methyl)-aniline (M-MIPA from Lonza); 4-chlorophenyl-N,N-dimethylurea (e.g. Monuron); 3,4-dichlorophenyl-N,N-dimethylurea (e.g. Diuron™) and dicyanodiamide (e.g. Amicure™ CG 1200 from Pacific Anchor Chemical).

Suitable curing agents also include anhydrides, particularly polycarboxylic anhydrides, such as nadic anhydride, methylnadic anhydride, phthalic anhydride, tetrahydrophthalic anhydride, hexahydrophthalic anhydride, methyltetrahydrophthalic anhydride, endomethylenetetrahydrophtalic anhydride, and trimellitic anhydride.

Reinforcement Fibers

For fabricating high-performance composite materials and prepregs, the reinforcing fibres for the purposes described herein may be characterized in general terms as having a high tensile strength (TS) (e.g. greater than 3500 MPa) and a high tensile modulus (TM) (e.g. greater than 230 GPa). Fibres useful for these purposes include carbon or graphite fibres, glass fibres and fibres formed of silicon carbide, alumina, titania, boron and the like, as well as fibres formed from organic polymers such as for example polyolefins, poly(benzothiazole), poly(benzimidazole), polyarylates, poly(benzoxazole), aromatic polyamides, polyaryl ethers and the like, and may include mixtures having two or more such fibres. Preferably, the fibres are selected from glass fibres, carbon fibres and aromatic polyamide fibres, such as the fibres sold by the DuPont Company under the trade name Kevlar. Furthermore, the reinforcement fibres to be impregnated with the resin matrix may be in the form of a sheet of continuous, unidirectional or multidirectional fibers, or as woven or nonwoven fabrics.

Composite Parts and Prepreg Layup

Multiple layers of prepreg plies may be laid up in a stacking arrangement to form a structural composite part that has a laminated structure, followed by curing. In certain embodiments, the prepreg plies within the layup may be positioned in a selected orientation with respect to one another. For example, a prepreg layup may include prepreg plies having unidirectional fiber architectures, with the fibers oriented at various angles, 0°, 45°, 90° etc., with respect to the largest dimension of the layup, such as the length. It may be further understood that, in certain embodiments, the prepregs having any combination of fiber architectures, such as unidirectional and multi-dimensional, may be combined to form the prepreg layup. The prepreg layup may be formed on a shaping tool to obtain a desired three-dimensional configuration. Curing of the prepreg layup usually occurs under heat and pressure.

EXAMPLES

The following examples serve to illustrate the product and process of the present disclosure.

Example 1

Two-film Process

A resin matrix was prepared based on the formulation shown in Table 1.

TABLE 1

| Components | Amounts [wt %] |
| --- | --- |
| Araldite PY306 | 23.6 |
| Araldite MY0510 | 23.6 |
| PES | 18.9 |
| 4,4' DDS | 23.9 |
| Aromatic nylon (dry) | 5.0 |
| Cross-linked PES-PEES particles | 5.0 |

The resin matrix was then filmed onto a support paper to form a resin film having a film aerial weight (FAW) of 50 gsm.

Toho Tenax IMS65 carbon fibres were spread in a prepreg machine to an aerial weight of 194 gsm. Two resin films were then pressed onto each opposing side of the spread fibres to obtain a prepreg with the following characteristics:

FAW=194 gsm

Resin Content=34%

Sheets cut from the above prepreg were laid up according to EN 2565 to form laminates. The laminates were then cured at 180° C. for 2 hours using a cure ramp rate of 2°

Figure 4:
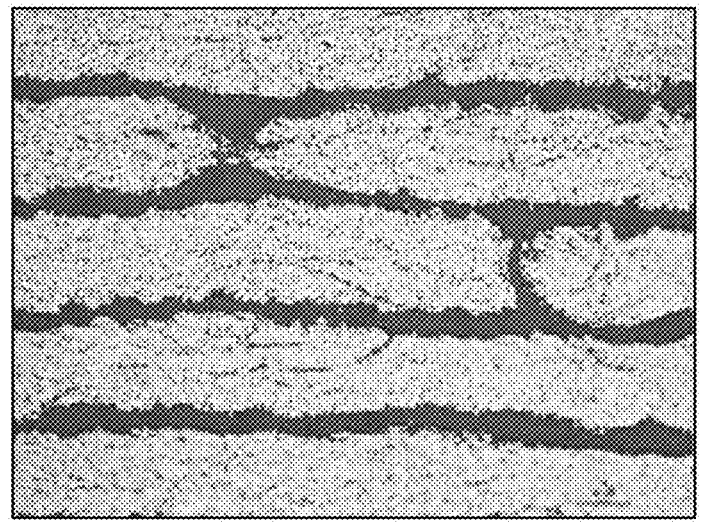
FIG. 4 is an optical microscopy image showing a cross-sectional view of a cured laminate formed according to a two-film process.

C./min to reach the curing temperature. FIG. 4 shows an optical microscopy image of the cured laminate (in cross-sectional view).

Example 2

Four-Film Process

Two different resin matrices were formed based on the formulations shown in Tables 2 and 3.

TABLE 2

| Components [U-Film] | Amounts (wt %) |
|---|---|
| Araldite PY 306 | 26.2 |
| Araldite MY 0510 | 26.2 |
| PES | 21.0 |
| 4,4' DDS | 26.6 |

TABLE 3

| Components [P-Film] | Amounts (wt %) |
|---|---|
| Araldite PY 306 | 21.0 |
| Araldite MY 0510 | 21.0 |
| PES | 16.8 |
| 4'4' DDS | 21.2 |
| Aromatic nylon | 10.0 |
| Cross-linked PES-PEES particles | 10.0 |

In the above Tables:
Araldite PY 306=Bi-functional epoxy based on bisphenol F
Araldite MY 0510=Triglycidyl ether of p-aminophenol The resin matrix based on the formulation of Table 2 was then filmed to an aerial weight of 25 gsm on a support paper to obtain a resin film labeled as "U-Film". The resin matrix based on the formulation of Table 3 was then filmed to an aerial weight of 25 gsm on a support paper to obtain a resin film labeled as "P-film". Toho Tenax IMS65 carbon fibres were spread in a prepreg machine to an aerial weight of 194 gsm. Using the four-film process described above, two U-films were pressed onto opposite sides of the spread fibres to obtain a resin-impregnated prepreg with the following characteristics:
FAW=194 gsm
Resin Content=20%

Two P-films were then pressed onto opposite sides of the prepreg obtained in the previous step to obtain a final prepreg with the following characteristics:
FAW=194 gsm
Resin Content=34%

Sheets cut from the above prepreg were laid up according to EN 2565 to form laminates. The laminates were then cured at 180° C. for 2 h using a cure ramp rate of 2° C./min to reach the curing temperature.

Figure 5:
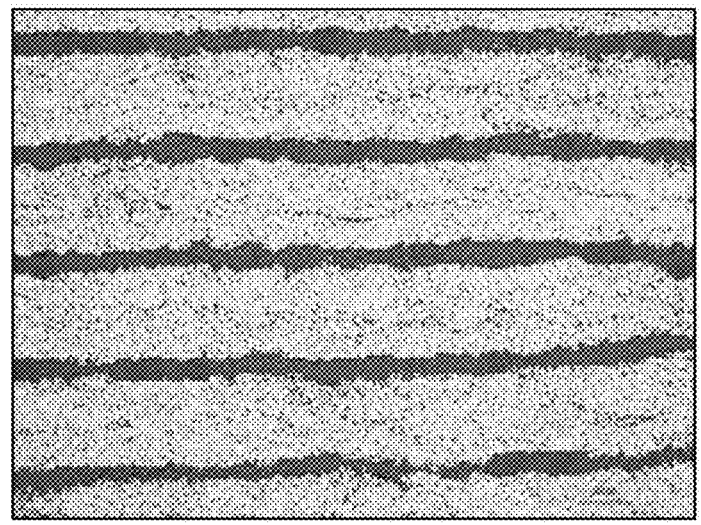
FIG. 5 is an optical microscopy image showing a cross-sectional view of a cured laminate formed according to a four-film process.

FIG. 5 shows an optical microscopy image (×10 magnification) of the cured laminate, in cross-sectional view, fabricated from the four-film process.

Figure 6A:
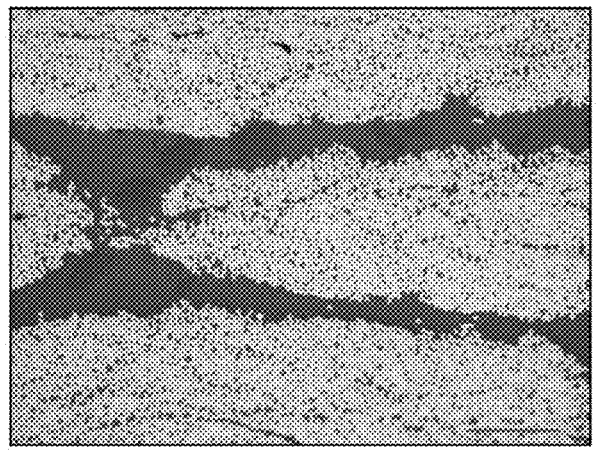
FIG. 6A is a magnified view of the interlaminar regions of the cured laminate shown in FIG. 4.
Figure 6B:
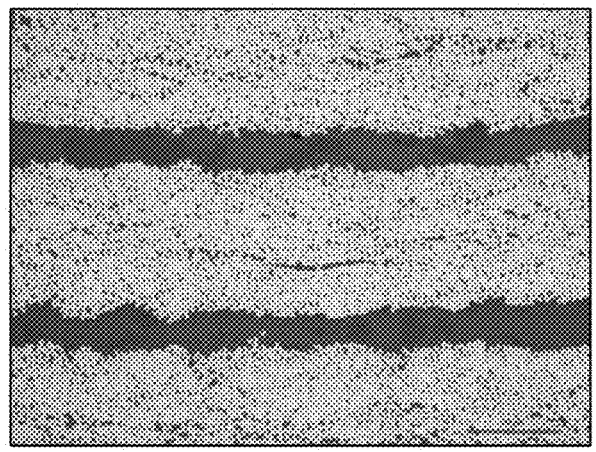
FIG. 6B is a magnified view of the interlaminar regions of the cured laminate shown in FIG. 5.

FIGS. 6A and 6B are ×20 magnified views of the interlaminar regions of the cured laminates shown in FIG. 4 and FIG. 5, respectively.

As can be seen from FIGS. 4, 5, 6A, and 6B, the laminate structure obtained by the four-film process has a much more uniform interlaminar region as compared to that obtained by the two-film process. Moreover, while for the laminate produced by the two-film process, a significant amount of particles appears to have migrated away from the interlaminar region and are embedded in within the fiber tows (FIGS. 4 and 6A), this does not appear to be the case for the laminate produced by the four-film process (FIGS. 5 and 6B) as most of the particles are confined to the interlaminar regions.

Mechanical Test Results

The mechanical properties of the cured laminates fabricated according to Examples 1 and 2 were measured according to the test methods disclosed in Table 4. The test results are also shown in Table 4.

TABLE 4

| | Properties | Units | Test method | Example1 Act. | Example1 Norm. | Example2 Act. | Example2 Norm. |
|---|---|---|---|---|---|---|---|
| | G2c-Crack 1 | J/m2 | Modified | 971 | NA | 1776 | NA |
| | G2c Average of 3 cracks | J/m2 | prEN6034 (*) | 753 | NA | 1097 | NA |
| CAI-3S | CAI | MPa | ASTM D7136/37 | 308 | 300 | 307 | 300 |
| 26J | CPT | mm | | 0.184 | 0.186 | 0.185 | 0.186 |
| | dent depth (witin 30 min) | mm | | 0.156 | | 0.163 | |
| CAI-3S | CSAI | MPa | | 288 | 280 | 289 | 286 |
| 30.5J | CPT | mm | | 0.184 | 0.186 | 0.187 | 0.186 |
| | dent depth (witin 30 min) | ksi | | 0.180 | | 0.183 | |

(*) Coupon width was 12.7 mm. Coupons pre-cracked in $G_{IIc}$ configuration rather tha $G_{Ic}$ configuration as specified in prEN6034.

The data summarized in Table 4 clearly show an increase in Mode II interlaminar toughness ($G_{IIc}$) associated with the laminate having a more uniform interlaminar region.

What is claimed is:
1. A curable prepreg ply comprising:
a layer of resin-impregnated reinforcement fibers having a top surface and a bottom surface;
two resin films applied to the top surface and the bottom surface of said layer, respectively,
wherein said layer of resin-impregnated reinforcement fibers comprises reinforcement fibers impregnated with a first curable resin matrix, and said resin films comprises a second curable resin matrix,
said second curable resin matrix comprises at least one thermoset resin, and a mixture of two different types of particles: (i) insoluble toughening particles, and (ii) partially soluble toughening particles, and
said first curable resin matrix comprises at least one thermoset resin, but is void of said insoluble toughening particles and said partially soluble or swellable toughening particles, and wherein said insoluble toughening particles are insoluble in the second resin matrix upon curing of the prepreg ply, and said partially soluble toughening particles are thermoplastic particles that decrease in volume by more than 5% upon curing of the prepreg ply, but remain as discreet particles after curing.

2. The curable prepreg ply of claim 1, wherein the ratio of insoluble toughening particles (i) to partially soluble toughening particles (ii) in the second resin matrix is ranging from 20:80 to 80:20.

3. The curable prepreg ply of claim 1, wherein the second resin matrix comprises at least one epoxy resin, and said insoluble toughening particles are thermoplastic particles that are insoluble in the epoxy resin upon curing of the epoxy resin.

4. The curable prepreg ply of claim 1, wherein the insoluble and partially soluble toughening particles have particle sizes in the range of 5 µm-70 µm.

5. The curable prepreg ply of claim 1, wherein each of the first and second resin matrices comprises a plurality of multifunctional epoxy resins which are common to both matrices.

6. A composite structure comprising a plurality of prepreg plies laid up in a stacking arrangement to form a laminate structure having toughening particles in the interlaminar regions, which are formed between adjacent layers of reinforcement fibers, wherein each prepreg ply is as recited in claim 1.

* * * * *